United States Patent
Dale et al.

(10) Patent No.: US 11,686,210 B2
(45) Date of Patent: Jun. 27, 2023

(54) COMPONENT ASSEMBLY FOR VARIABLE AIRFOIL SYSTEMS

(71) Applicant: General Electric Company, Schenectady, NY (US)

(72) Inventors: Dane Michael Dale, Cincinnati, OH (US); Brandon ALlonson Reynolds, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/210,760

(22) Filed: Mar. 24, 2021

(65) Prior Publication Data

US 2022/0307384 A1    Sep. 29, 2022

(51) Int. Cl.
*F01D 17/14* (2006.01)
*F01D 17/12* (2006.01)
*F01D 9/02* (2006.01)

(52) U.S. Cl.
CPC ............. *F01D 17/12* (2013.01); *F01D 9/023* (2013.01); *F01D 17/14* (2013.01); *F01D 17/141* (2013.01); *F05D 2220/32* (2013.01); *F05D 2240/128* (2013.01)

(58) Field of Classification Search
CPC ........ F01D 9/023; F01D 17/14; F01D 17/141; F01D 17/148; F01D 17/16; F01D 17/162; F01D 17/167; F01D 1/24; F01D 1/26
See application file for complete search history.

(56) References Cited

U.S. PATENT DOCUMENTS

| 2,780,060 A * | 2/1957 | Griffith ..................... F23R 3/16 |
| | | 60/752 |
| 2,979,809 A | 4/1961 | Dennis |
| 3,606,580 A | 9/1971 | Kaufman, Sr. |
| 3,650,635 A | 3/1972 | Wachtell et al. |
| 3,879,939 A | 4/1975 | Markowski |
| 4,195,396 A * | 4/1980 | Blazek ..................... B23P 15/04 |
| | | 29/889 |
| 4,792,295 A | 12/1988 | Joyce, Sr. |
| 5,044,881 A | 9/1991 | Dodd et al. |
| 5,307,624 A | 5/1994 | Even-Nur et al. |
| 6,343,463 B1 | 2/2002 | Mei |
| 6,375,419 B1 | 4/2002 | LeJambre et al. |
| 6,382,906 B1 | 5/2002 | Brassfield et al. |
| 7,040,097 B2 | 5/2006 | Mukherjee |
| 7,097,432 B1 * | 8/2006 | Lombard .............. F01D 17/143 |
| | | 415/199.1 |
| 8,033,790 B2 | 10/2011 | Vance |
| 8,056,336 B2 | 11/2011 | Arnold et al. |
| 8,317,465 B2 | 11/2012 | Smith |
| 8,714,916 B2 | 5/2014 | Jarrett, Jr. et al. |

(Continued)

*Primary Examiner* — J. Todd Newton
*Assistant Examiner* — Behnoush Haghighian
(74) *Attorney, Agent, or Firm* — Dority & Manning, P.A.

(57) ABSTRACT

A component assembly for a gas turbine engine defining a core air flowpath is provided. The component assembly includes an outer shell comprising a first array of integral outer shell airfoils that extend inward from an outer shell periphery; and an inner shell comprising a second array of integral inner shell airfoils that extend outward from an inner shell periphery, wherein the outer shell and the inner shell are one or both of translatable and rotatable relative to one another between a first position and a second position.

16 Claims, 14 Drawing Sheets

(56) References Cited

U.S. PATENT DOCUMENTS

| | | | |
|---|---|---|---|
| 8,764,388 B2* | 7/2014 | Roberts | F02B 37/22 |
| | | | 60/602 |
| 9,121,301 B2 | 9/2015 | Floyd et al. | |
| 9,546,562 B2 | 1/2017 | Hillier | |
| 9,593,587 B2 | 3/2017 | Matsumoto et al. | |
| 9,771,942 B2* | 9/2017 | Faeth | F02C 6/12 |
| 9,982,547 B2 | 5/2018 | Boeck | |
| 10,145,336 B2 | 12/2018 | Buey | |
| 10,301,967 B2* | 5/2019 | Slavens | F01D 17/162 |
| 10,385,728 B2* | 8/2019 | Slavens | F01D 5/02 |
| 10,458,267 B2* | 10/2019 | Gibson | F01D 11/025 |
| 10,539,020 B2* | 1/2020 | Stuart | F02K 3/072 |
| 10,544,734 B2* | 1/2020 | Stuart | F01D 1/26 |
| 10,605,168 B2* | 3/2020 | Stuart | F01D 5/087 |
| 10,655,537 B2* | 5/2020 | Stuart | F02C 3/067 |
| 10,711,629 B2* | 7/2020 | van der Merwe | F01D 11/24 |
| 10,718,229 B2* | 7/2020 | Froemming | F01D 17/167 |
| 10,815,821 B2 | 10/2020 | Sener et al. | |
| 11,067,277 B2* | 7/2021 | Correia | F02C 7/28 |
| 11,085,309 B2* | 8/2021 | Mondal | F01D 5/03 |
| 2013/0084169 A1 | 4/2013 | Kareff et al. | |
| 2015/0285157 A1 | 10/2015 | Burdick et al. | |
| 2015/0337664 A1 | 11/2015 | Cosi et al. | |
| 2015/0345376 A1* | 12/2015 | Ibaraki | F01D 5/18 |
| | | | 60/605.1 |
| 2016/0251980 A1* | 9/2016 | Slavens | F02C 3/04 |
| | | | 60/806 |
| 2016/0258309 A1 | 9/2016 | Wilber | |
| 2016/0341068 A1 | 11/2016 | Robertson, Jr. et al. | |
| 2018/0023411 A1* | 1/2018 | Froemming | F02K 1/825 |
| | | | 415/148 |
| 2018/0100433 A1* | 4/2018 | Correia | F23R 3/007 |
| 2018/0135518 A1 | 5/2018 | Moniz et al. | |
| 2018/0274365 A1* | 9/2018 | Stuart | F02C 3/067 |
| 2019/0128131 A1 | 5/2019 | Sener et al. | |
| 2021/0363891 A1* | 11/2021 | Edwards | F01D 9/04 |

* cited by examiner

006
COMPONENT ASSEMBLY FOR VARIABLE AIRFOIL SYSTEMS

CROSS-REFERENCE TO RELATED APPLICATION

This application is a related application of co-pending U.S. application Ser. No. 17/210,773 titled "Component Assembly for a Combustion Section of a Gas Turbine Engine," filed concurrently on Mar. 24, 2021, which is hereby incorporated by reference in its entirety.

FIELD

The present subject matter relates generally to a gas turbine engine, or more particularly to a component assembly for variable airfoil systems in a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

A forward end of the turbine section includes a first stage of turbine nozzles for directing and metering combustion gases from the combustion section through the turbine section. The first stage of turbine nozzles may be attached at a forward end to an outer liner or an inner liner of a combustor of the combustion section, and at an aft end to, e.g. a shroud surrounding a first stage of turbine rotor blades.

BRIEF DESCRIPTION

Aspects and advantages of the invention will be set forth in part in the following description, or may be obvious from the description, or may be learned through practice of the invention.

In one exemplary embodiment of the present disclosure, a component assembly for a gas turbine engine defining a core air flowpath is provided. The component assembly includes an outer shell comprising a first array of integral outer shell airfoils that extend inward from an outer shell periphery; and an inner shell comprising a second array of integral inner shell airfoils that extend outward from an inner shell periphery, wherein the outer shell and the inner shell are one or both of translatable and rotatable relative to one another between a first position and a second position.

In certain exemplary embodiments the outer shell and the inner shell are both translatable and rotatable relative to one another between the first position and the second position.

In certain exemplary embodiments in the first position, a first throat distance is defined between the outer shell and the inner shell, and, in the second position, a second throat distance is defined between the outer shell and the inner shell, and the second throat distance is less than the first throat distance.

In certain exemplary embodiments the outer shell rotates with respect to the inner shell such that the integral outer shell airfoils move relative to the integral inner shell airfoils.

In certain exemplary embodiments the outer shell translates in an axial direction with respect to the inner shell.

In certain exemplary embodiments the component assembly further includes an actuator in communication with one of the outer shell and the inner shell, wherein the actuator rotates the outer shell and the inner shell relative to one another, and wherein the actuator translates the outer shell and the inner shell relative to one another.

In certain exemplary embodiments the gas turbine engine includes a combustor defining a combustion chamber, wherein the outer shell at least partially defines the core air flowpath, wherein the inner shell at least partially defines the core air flowpath, wherein a portion of the outer shell defines a first part of the combustion chamber, and wherein a portion of the inner shell defines a second part of the combustion chamber.

In certain exemplary embodiments the actuator is located upstream of the combustor.

In another exemplary embodiment of the present disclosure, a component assembly for a gas turbine engine defining a core air flowpath is provided. The component assembly includes an outer shell comprising a first array of integral outer shell airfoils that extend inward from an outer shell periphery; an inner shell comprising a second array of integral inner shell airfoils that extend outward from an inner shell periphery; and an actuator in communication with one of the outer shell and the inner shell, wherein the outer shell and the inner shell are one or both of translatable and rotatable relative to one another between a first position and a second position.

In certain exemplary embodiments the actuator rotates the outer shell and the inner shell relative to one another, and wherein the actuator translates the outer shell and the inner shell relative to one another.

In certain exemplary embodiments the gas turbine engine includes a combustor defining a combustion chamber, wherein the outer shell at least partially defines the core air flowpath, wherein the inner shell at least partially defines the core air flowpath, wherein a portion of the outer shell defines a first part of the combustion chamber, and wherein a portion of the inner shell defines a second part of the combustion chamber.

In an exemplary aspect of the present disclosure, a method is provided for varying a throat distance between airfoils in a gas turbine engine. The method includes providing a component assembly comprising an outer shell having a first array of integral outer shell airfoils and an inner shell having a second array of integral inner shell airfoils; rotating the outer shell and the inner shell relative to one another from a first position to a second position; and translating the outer shell and the inner shell relative to one another from the first position to the second position.

In certain exemplary aspects wherein rotating the outer shell and the inner shell relative to one another from the first position to the second position moves the integral outer shell airfoils relative to the integral inner shell airfoils, and wherein translating the outer shell and the inner shell relative to one another from the first position to the second position includes moving the outer shell and the inner shell relative to one another in an axial direction.

In certain exemplary aspects in the first position, a first throat distance is defined between the outer shell and the inner shell, and, in the second position, a second throat distance is defined between the outer shell and the inner shell, and the second throat distance is less than the first throat distance.

In certain exemplary aspects the method further includes providing an actuator in communication with one of the outer shell and the inner shell, wherein the actuator rotates the outer shell and the inner shell relative to one another, and wherein the actuator translates the outer shell and the inner shell relative to one another.

In certain exemplary aspects the gas turbine engine defines a core air flowpath and includes a combustor defining a combustion chamber, wherein the outer shell at least partially defines the core air flowpath, and wherein the inner shell at least partially defines the core air flowpath, wherein a portion of the outer shell defines a first part of the combustion chamber, and wherein a portion of the inner shell defines a second part of the combustion chamber.

In certain exemplary aspects the actuator is provided upstream of the combustor.

In certain exemplary aspects the outer shell and the inner shell are in the first position during an engine take-off condition, and the outer shell and the inner shell are rotated and translated to the second position during an engine cruise condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
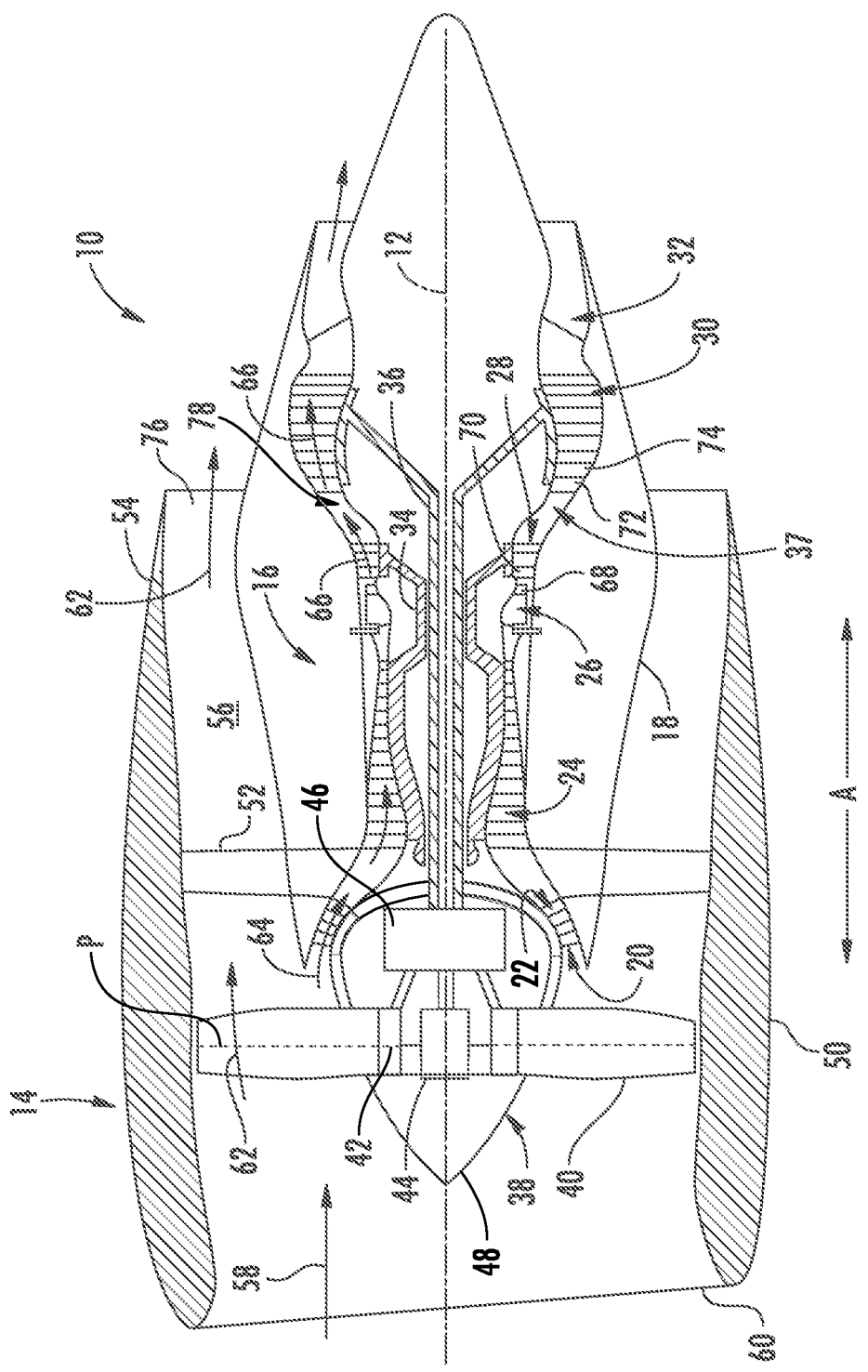
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

The present disclosure includes a component assembly for a gas turbine engine having a combustor defining a combustion chamber, the gas turbine engine defining a core air flowpath, a radial direction, and a circumferential direction. The component assembly includes an outer shell at least partially defining the core air flowpath, the outer shell having an outer shell periphery that comprises a first array of integral outer shell airfoils that extend inward from the outer shell periphery. The component assembly further includes an inner shell at least partially defining the core air flowpath, the inner shell having an inner shell periphery that comprises a second array of integral inner shell airfoils that extend outward from the inner shell periphery. By having the integral inner shell airfoils with the geometry described herein and integral with the inner shell and the integral outer shell airfoils with the geometry described herein and integral with the outer shell, the airfoils of the present disclosure have a more aerodynamic shape and function than conventional systems in which nozzles are arranged as separate components aft of the combustor.

The present disclosure creates a shelled, lobe structure and is capable of replacing the stage one nozzles. In one embodiment, the continuous rings of the combustion liners are extended to replace the nozzle bands and the nozzle airfoils are formed as cantilevered lobes on the aft side of the combustor liners. As described herein, half of the airfoils are placed on the inner liner and half are placed on the outer liner and then mesh together at assembly to form a fully integrated flow path structure. In this manner, by integrating the airfoils and the nozzle geometry into the combustion liners to form a singular flow path structure eliminates flow path steps, purge flows, and interfacing hardware. The present disclosure reduces weight, simplifies mounting configuration, optimizes geometry into integral shell architecture, eliminates segment gaps inside assemblies, eliminates axial purge, reduces number of parts by eliminating individual nozzle singlet/doublets, seals, and supporting hardware, maintains cooling film from liner onto nozzle bands, and mitigates flow path steps.

In some embodiments, the present disclosure provides a component assembly having an outer shell and an inner shell that are fixed relative to one another, i.e., significant relative movement between the outer shell and the inner shell is prevented. In other exemplary embodiments, the present disclosure provides a component assembly having an outer shell and an inner shell that are translatable relative to one another and rotatable relative to one another between a first position and a second position.

In this manner, a component assembly of the present disclosure allows a core air flowpath of an engine to be manipulated, i.e., a portion of the core air flowpath, such as a throat portion of the core air flowpath, can be increased or reduced during an aircraft mission. This allows the throat of the core air flowpath to be set at a desired or optimum position during specific flight conditions of the aircraft mission.

Furthermore, a component assembly of the present disclosure allows for an actuator to be located upstream of a combustor of the engine, where the actuator rotates the outer shell and/or the inner shell relative to one another and/or translates the outer shell and/or the inner shell relative to one another. In this manner, performance of the actuator is increased because of reduced temperatures in this location and increased physical volume in this location which enable a more robust actuation system.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference), a radial direction R, and a circumferential direction (i.e., a direction extending about the axial direction A; not depicted). In general, the turbofan 10 includes a fan section 14 and a turbomachine or core turbine engine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. Additionally, or alternatively, aspects of the present disclosure may be utilized with any other suitable aeronautical gas turbine engine, such as a turboshaft engine, turboprop engine, turbojet engine, etc. Moreover, aspects of the present disclosure may further be utilized with any other land-based gas turbine engine, such as a power generation gas turbine engine, or any aeroderivative gas turbine engine, such as a nautical gas turbine engine.

Figure 2:
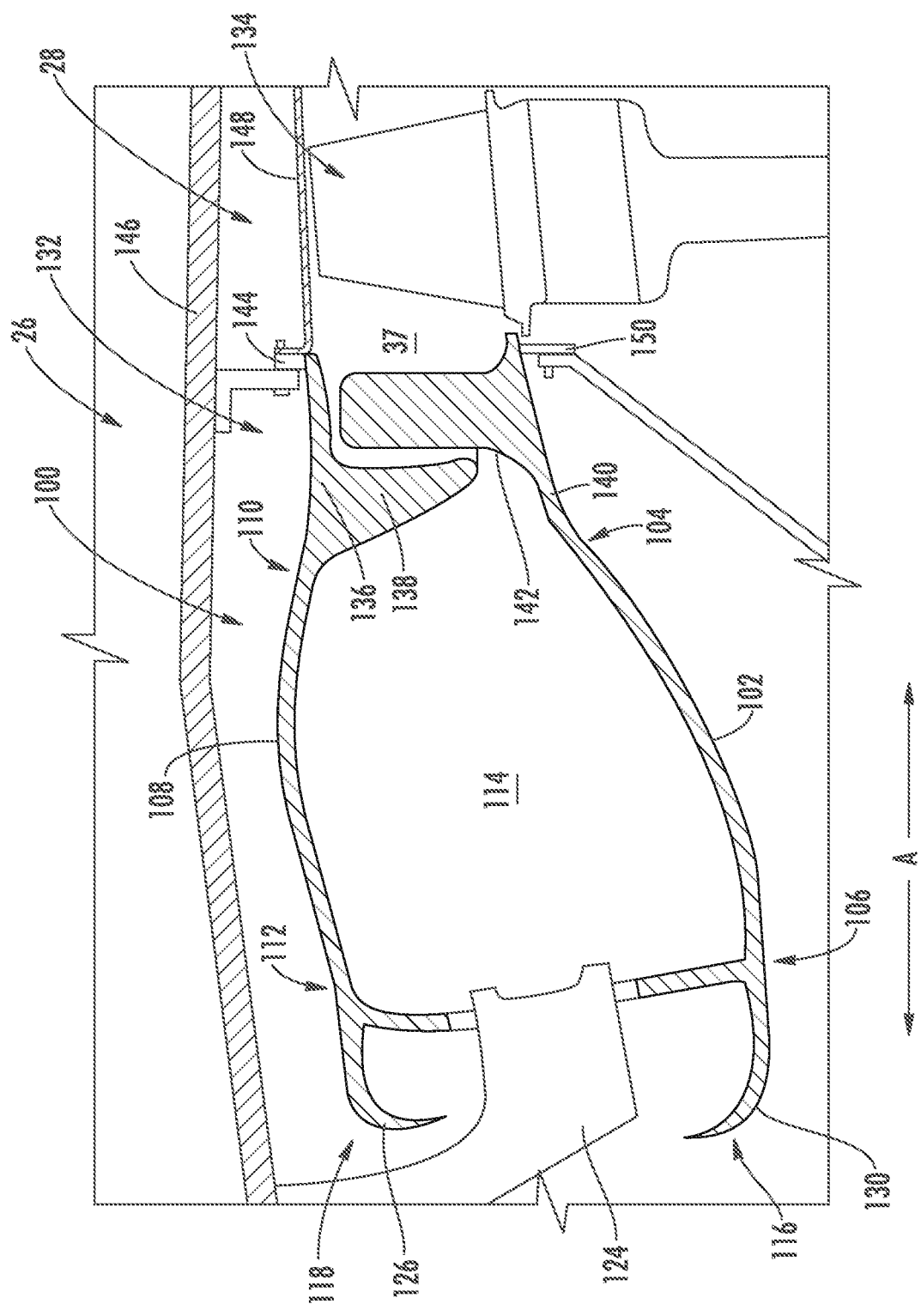
FIG. 2 is a schematic, cross-sectional view of a combustor assembly and a portion of a turbine section, including a component assembly, in accordance with an exemplary embodiment of the present disclosure.

Referring now to FIG. 2, a close-up, side, cross-sectional view is provided of a combustor assembly 100 and turbine in accordance with an exemplary embodiment of the present disclosure. In at least certain exemplary aspects, the combustor assembly 100 of FIG. 2 may be positioned in a combustion section 26 of the exemplary turbofan engine 10 of FIG. 1, and similarly, the turbine of FIG. 2 may be positioned in the turbine section 28 of the exemplary turbofan engine 10 of FIG. 1.

As shown, the combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 formed integrally with the forward end 106 of the inner liner 102 and an outer dome section 118 formed generally with the forward end 112 of the outer liner 108. Further, the inner and outer dome sections 116, 118 may each be formed integrally (or alternatively may be formed of a plurality of components attached in any suitable manner) and may each extend along the circumferential direction C to define an annular shape. It should be appreciated, however, that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration.

Referring still to FIG. 2, the combustor assembly 100 further includes a plurality of fuel air mixers 124 spaced along the circumferential direction C (FIG. 3B) and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, in an exemplary embodiment, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section into or through one or more of the fuel air mixers 124. Again, however, in other embodiments, the annular dome may be configured in any other suitable manner.

For the embodiment depicted, the inner liner 102 and the outer liner 108 are each formed of a ceramic matrix composite (CMC) material, which is a non-metallic material comprising ceramic fibers reinforcing a ceramic matrix and having high temperature capability. Exemplary CMC materials utilized for such liners 102, 108 may include, by way of example and not limitation, silicon carbide, silicon, silica or alumina matrix materials and combinations thereof. The ceramic fibers may include, by way of example and not limitation, oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

Referring still to FIG. 2, and as is discussed above, the combustion gases 66 flow from the combustion chamber 114 into and through the turbine section of the turbofan engine 10, where a portion of thermal and/or kinetic energy from the combustion gases 66 is extracted via sequential stages of turbine stator vanes and turbine rotor blades. Notably, the turbine depicted in FIG. 2 is configured as an HP turbine 28, located immediately downstream of the combustion chamber 114 defined by the combustor assembly 100 of the combustion section 26.

As is depicted, the exemplary HP turbine 28 of FIG. 2 includes a component assembly 132 positioned at a forward end of the HP turbine 28, at a location downstream of, or rather immediately downstream of, the combustion chamber 114 of the combustor assembly 100. In exemplary embodiments, the component assembly 132 defines a part of the combustion chamber 114. Additionally, the component assembly 132 is positioned immediately upstream of a first stage of turbine rotor blades 134. As will be described in greater detail below, the component assembly 132 is configured to orient the combustion gases 66 from the combustion chamber 114 in a desired flow direction to increase a performance of the HP turbine 28. The component assembly 132 of the HP turbine 28 depicted may generally replace a first stage of nozzles of the HP turbine 28.

Figure 3A:
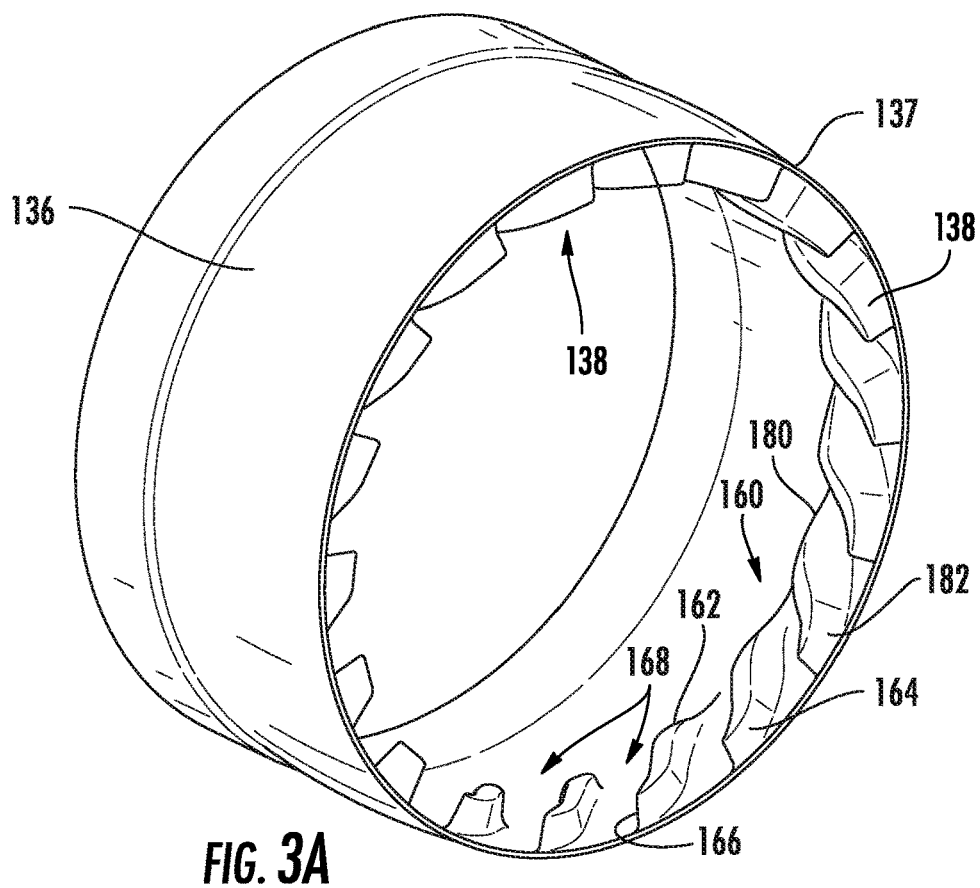
FIG. 3A is a perspective view of an outer shell of a component assembly in accordance with an exemplary embodiment of the present disclosure.
Figure 3B:
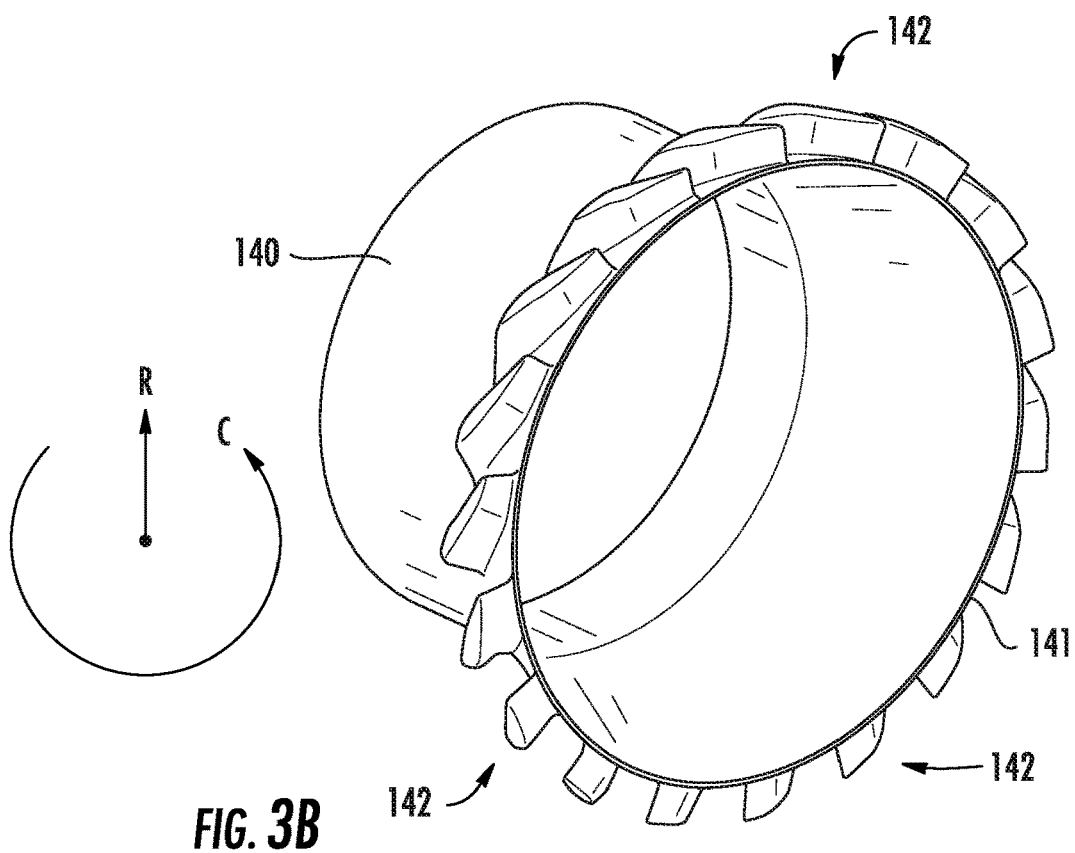
FIG. 3B is a perspective view of an inner shell of a component assembly in accordance with an exemplary embodiment of the present disclosure.
Figure 3C:
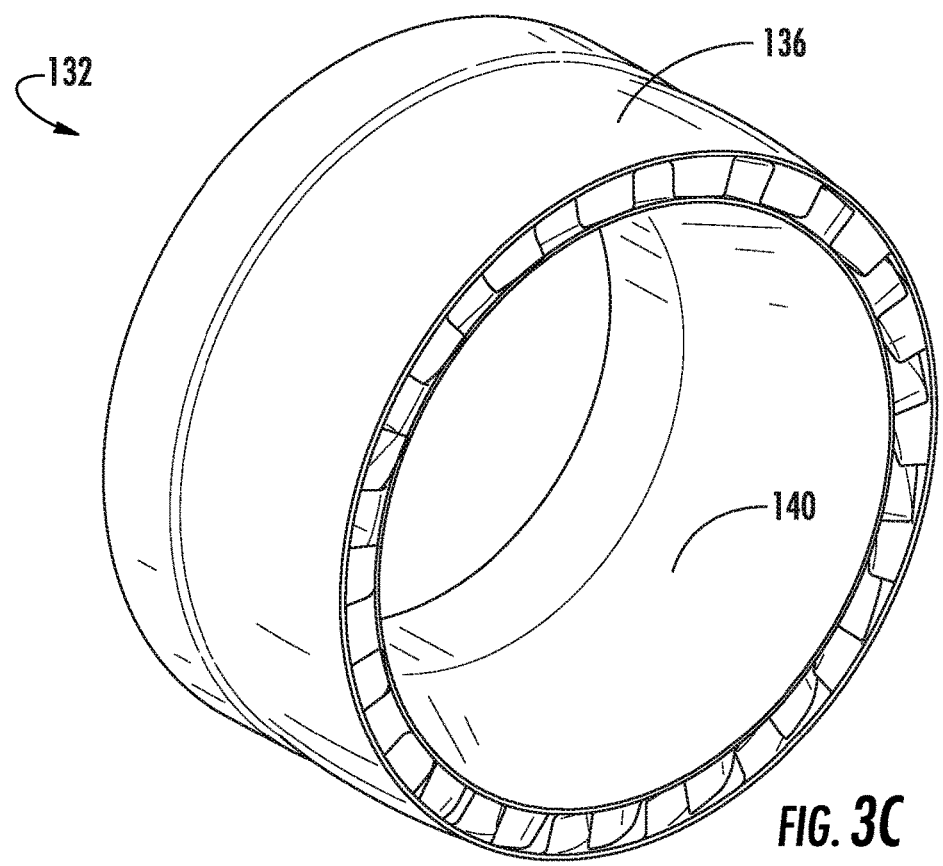
FIG. 3C is an assembled, perspective view of an inner shell and an outer shell of a component assembly in accordance with an exemplary embodiment of the present disclosure.
Figure 9:
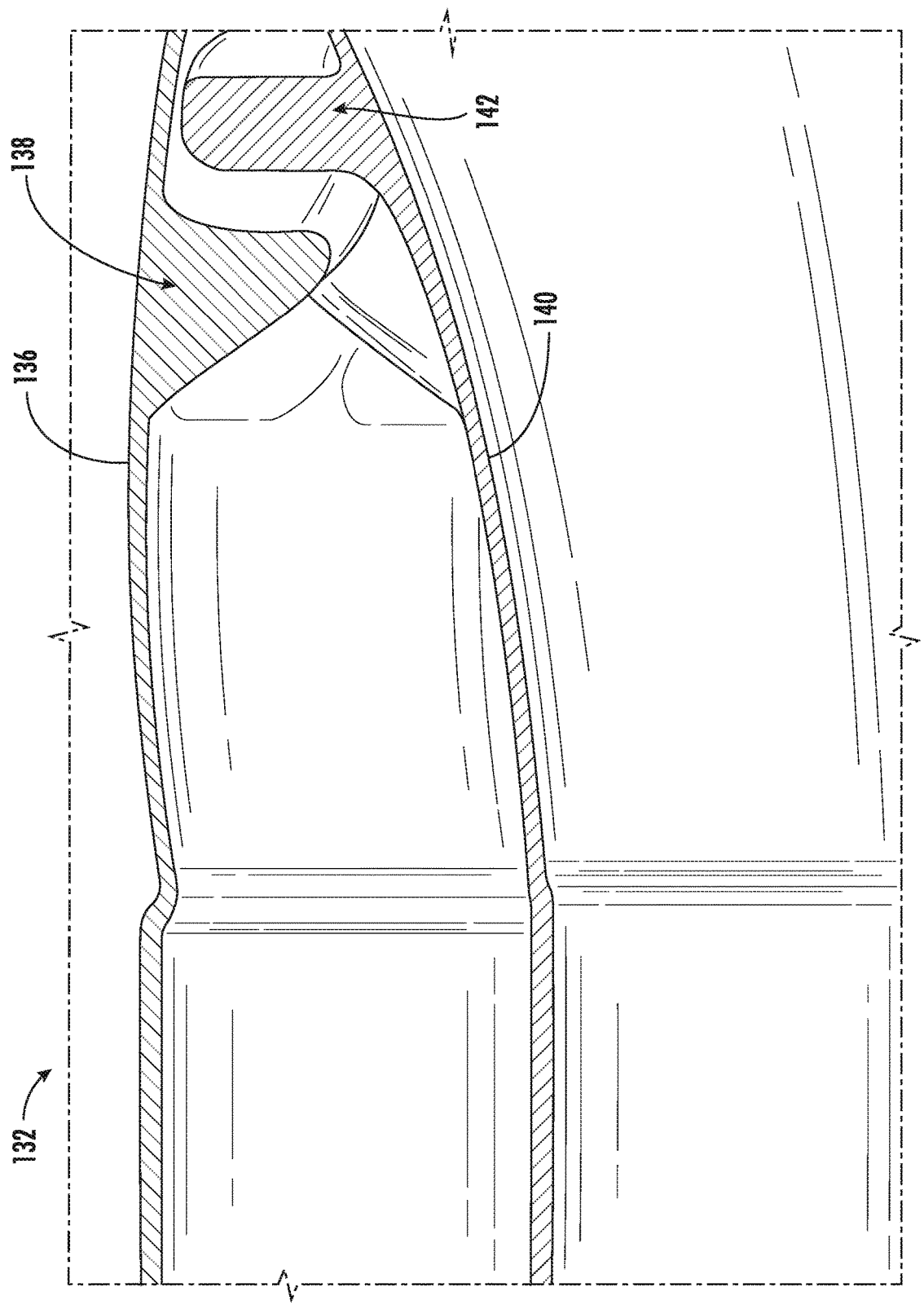
FIG. 9 is another close-up assembled, perspective view of a portion of an inner shell and an outer shell of a component assembly in accordance with an exemplary embodiment of the present disclosure.
Figure 10:
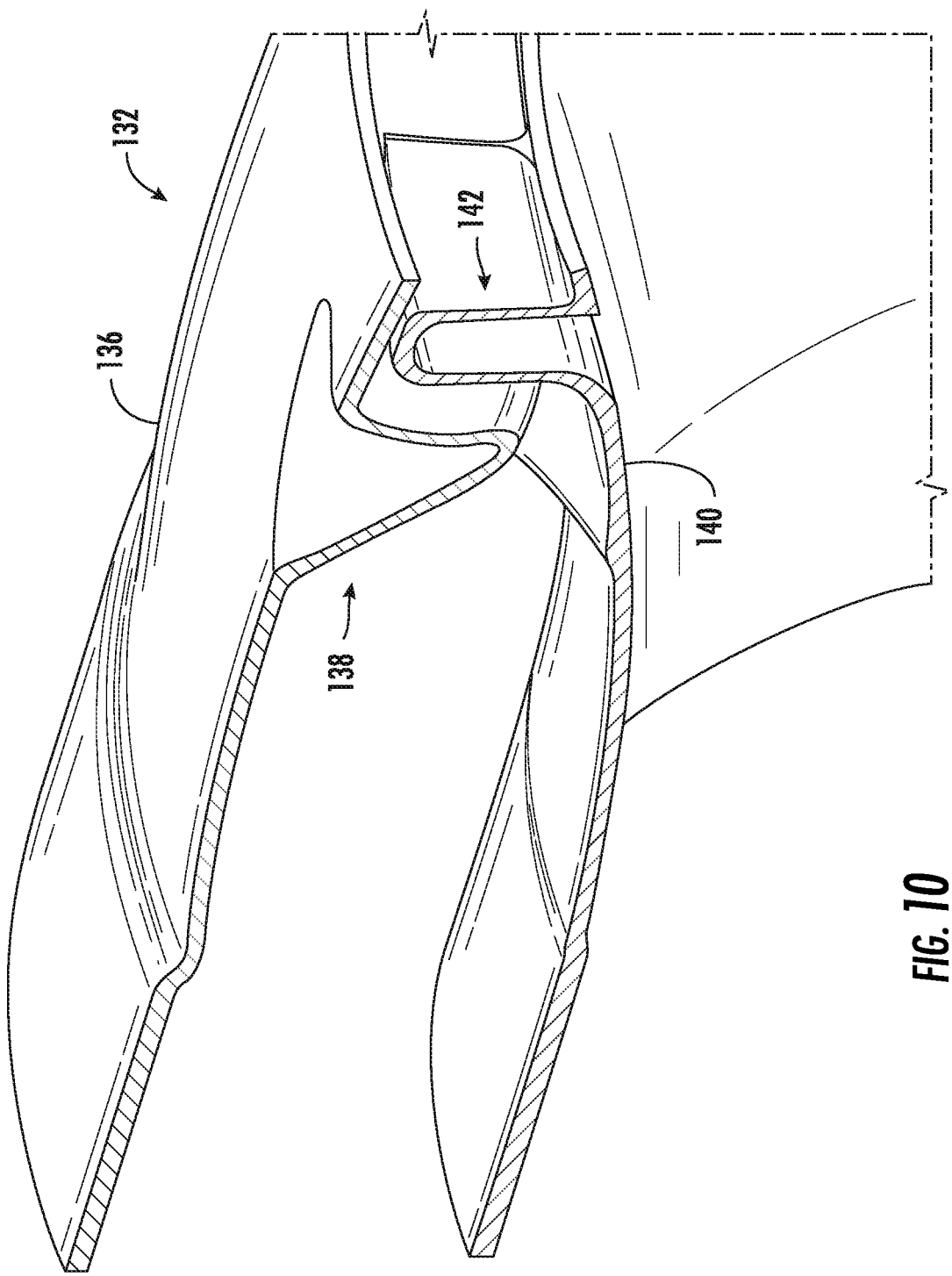
FIG. 10 is another close-up assembled, perspective view of a portion of an inner shell and an outer shell of a component assembly in accordance with an exemplary embodiment of the present disclosure.

Referring to FIGS. 2, 3A, and 3C, the component assembly 132 includes an outer shell 136 at least partially defining the core air flowpath 37. In an exemplary embodiment, the outer shell 136 includes an outer shell periphery 137 having a first array of integral outer shell airfoils 138 that extend inward from the outer shell periphery 137. In one embodiment, the integral outer shell airfoils 138 are integral to the outer shell 136, are formed integrally with the outer shell 136, and are formed by portions of the outer shell 136. As shown in FIG. 2, in one embodiment, the integral outer shell airfoils 138 are integral to the outer shell 136 and are integral with the outer liner 108. For example, in some exemplary embodiments, the integral outer shell airfoils 138, the outer shell 136, and the outer liner 108 may each be formed integrally of the same ceramic matrix composite (CMC) material. In other exemplary embodiments, the integral outer shell airfoils 138, the outer shell 136, and the outer liner 108 may each be formed integrally of any other suitable material, such as a suitable metal material. This integral configuration of the present disclosure enables the integral outer shell airfoils 138 to be hollow, as shown in FIG. 10. The integral outer shell airfoils 138 may also be configured as solid airfoils, as shown in FIG. 9. In an exemplary embodiment, the integral outer shell airfoils 138 extend inward from the outer shell periphery 137 along the radial direction R and are spaced apart along the circumferential direction C (FIG. 3B). Furthermore, a portion of the outer shell 136 may define a first part of the combustion chamber 114.

Referring to FIGS. 2, 3B, 3C, and 4, the component assembly 132 also includes an inner shell 140 at least partially defining the core air flowpath 37. In an exemplary embodiment, the inner shell 140 includes an inner shell periphery 141 having a second array of integral inner shell airfoils 142 that extend outward from the inner shell periphery 141. In one embodiment, the integral inner shell airfoils 142 are integral to the inner shell 140, are formed integrally with the inner shell 140, and are formed by portions of the inner shell 140. As shown in FIG. 2, in one embodiment, the integral inner shell airfoils 142 are integral to the inner shell 140 and are integral with the inner liner 102. For example, in some exemplary embodiments, the integral inner shell airfoils 142, the inner shell 140, and the inner liner 102 may each be formed integrally of the same ceramic matrix composite (CMC) material. In other exemplary embodiments, the integral inner shell airfoils 142, the inner shell 140, and the inner liner 102 may each be formed integrally of any other suitable material, such as a suitable metal material. This integral configuration of the present disclosure enables the integral inner shell airfoils 142 to be hollow, as shown in FIG. 10. The integral inner shell airfoils 142 may also be configured as solid airfoils, as shown in FIG. 9. In an exemplary embodiment, the integral inner shell airfoils 142 extend outward from the inner shell periphery 141 along the radial direction R and are spaced apart along the circumferential direction C (FIG. 3B). Furthermore, a portion of the inner shell 140 may define a second part of the combustion chamber 114. Referring to FIGS. 2-10, the integral outer shell airfoils 138 and the integral inner shell airfoils 142 are disposed in a staggered and alternating arrangement. For example, as will be appreciated from FIGS. 2-10, each of the integral inner shell airfoils 142 are located between adjacent integral outer shell airfoils 138 along the circumferential direction C and may have a shape that is complementary to a shape of the adjacent integral outer shell airfoils 138. In an exemplary embodiment, the inner shell 140 is completely separate from the outer shell 136 in that the inner shell 140 is not directly connected to the outer shell 136. For example, the integral inner shell airfoils 142 do not contact the outer shell 136, and the integral outer shell airfoils 138 do not contact the inner shell 140.

Referring to FIGS. 3A-10, in one exemplary embodiment, the outer shell 136 and the inner shell 140 are fixed relative to one another, i.e., significant relative movement between the outer shell 136 and the inner shell 140 is prevented. Referring to FIGS. 11-15, in other exemplary embodiments, the outer shell 136, 236 and the inner shell 140, 240 are translatable relative to one another and rotatable relative to one another between a first position and a second position, as described in detail below.

Referring to FIG. 2, in an exemplary embodiment, the outer shell 136 of the component assembly 132 includes an outer flange 144 located aft of the integral outer shell airfoils 138 and extending outwardly along the radial direction R. The outer flange 144 of the outer shell 136 is utilized for attaching the outer shell 136 of the component assembly 132 to a casing 146 of the gas turbine engine, and further, for the embodiment depicted, for attaching the outer shell 136 to a shroud assembly 148 surrounding the first stage turbine rotor blades 134. Similarly, for the embodiment depicted, the inner shell 140 includes an inner flange 150 extending inwardly along the radial direction R at a location aft of the integral inner shell airfoils 142. The inner flange 150 of the inner shell 140 is utilized for attaching the inner shell 140 of the component assembly 132 to an inner structural component of the gas turbine engine (not shown). The outer flange 144 of the outer shell 136 and/or the inner flange 150 of the inner shell 140 may extend continuously along the circumferential direction C, or alternatively, may be configured as a plurality of discrete flanges spaced along the circumferential direction C. However, in other embodiments, one or both of the outer shell 136 or inner shell 140 of the component assembly 132 may instead be mounted in any other suitable manner within the gas turbine engine.

FIGS. 2-10 illustrate exemplary embodiments of the present disclosure. Referring to FIG. 3A, in an exemplary embodiment, the integral outer shell airfoils 138 include a first transition portion 160 at a first leading edge 162 and a first edge portion 164 at a first trailing edge 166. In one embodiment, the first transition portion 160 extends obliquely inward from the outer shell periphery 137. For example, the first transition portion 160 extends at an angle inward from the outer shell periphery 137, wherein the angle is not perpendicular to the outer shell periphery 137. In one embodiment, the outer shell 136 also defines a U-shaped trough 168 between adjacent integral outer shell airfoils 138. These U-shaped troughs 168 receive corresponding integral inner shell airfoils 142 in the staggered and alternating arrangement described herein.

In one embodiment, the integral outer shell airfoils 138 have a varying thickness from the first leading edge 162 to the first trailing edge 166. For example, the first transition portion 160 that extends obliquely inward from the outer shell periphery 137 has a first thickness portion that is less than a second thickness portion at the first edge portion 164. In an exemplary embodiment, the integral outer shell airfoils 138 have a non-symmetrical geometry. For example, the first transition portion 160 that extends obliquely inward from the outer shell periphery 137 has a first geometrical portion 180 that is different than a second geometrical portion 182 at the first edge portion 164.

Figure 4:
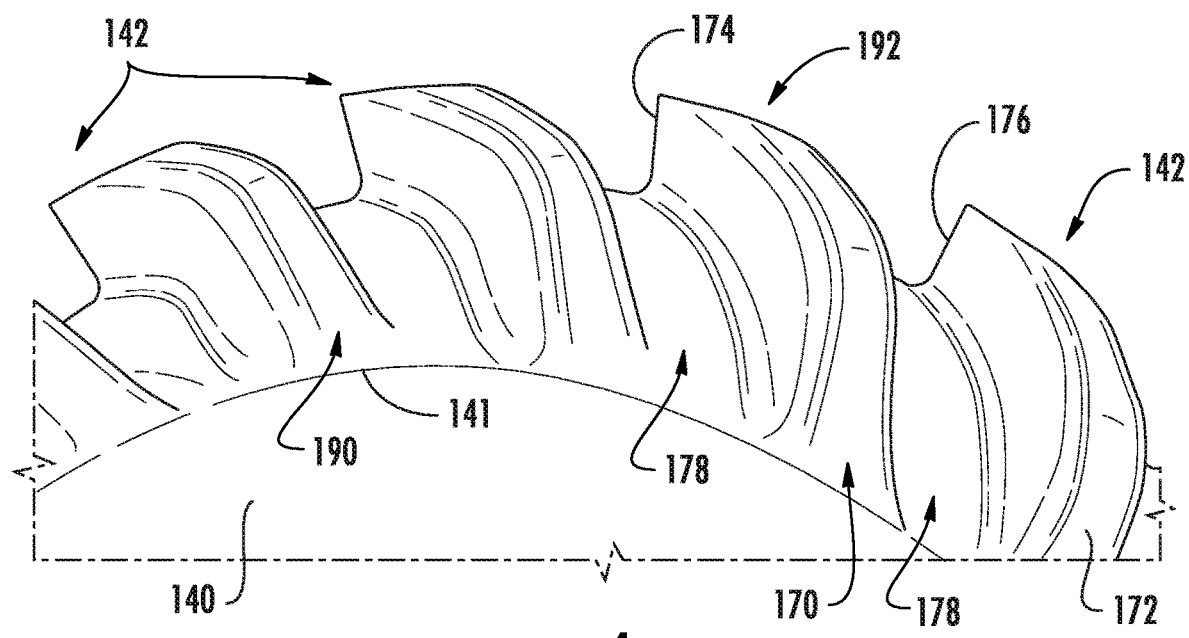
FIG. 4 is a perspective view of an array of integral inner shell airfoils in accordance with an exemplary embodiment of the present disclosure.
Figure 5:
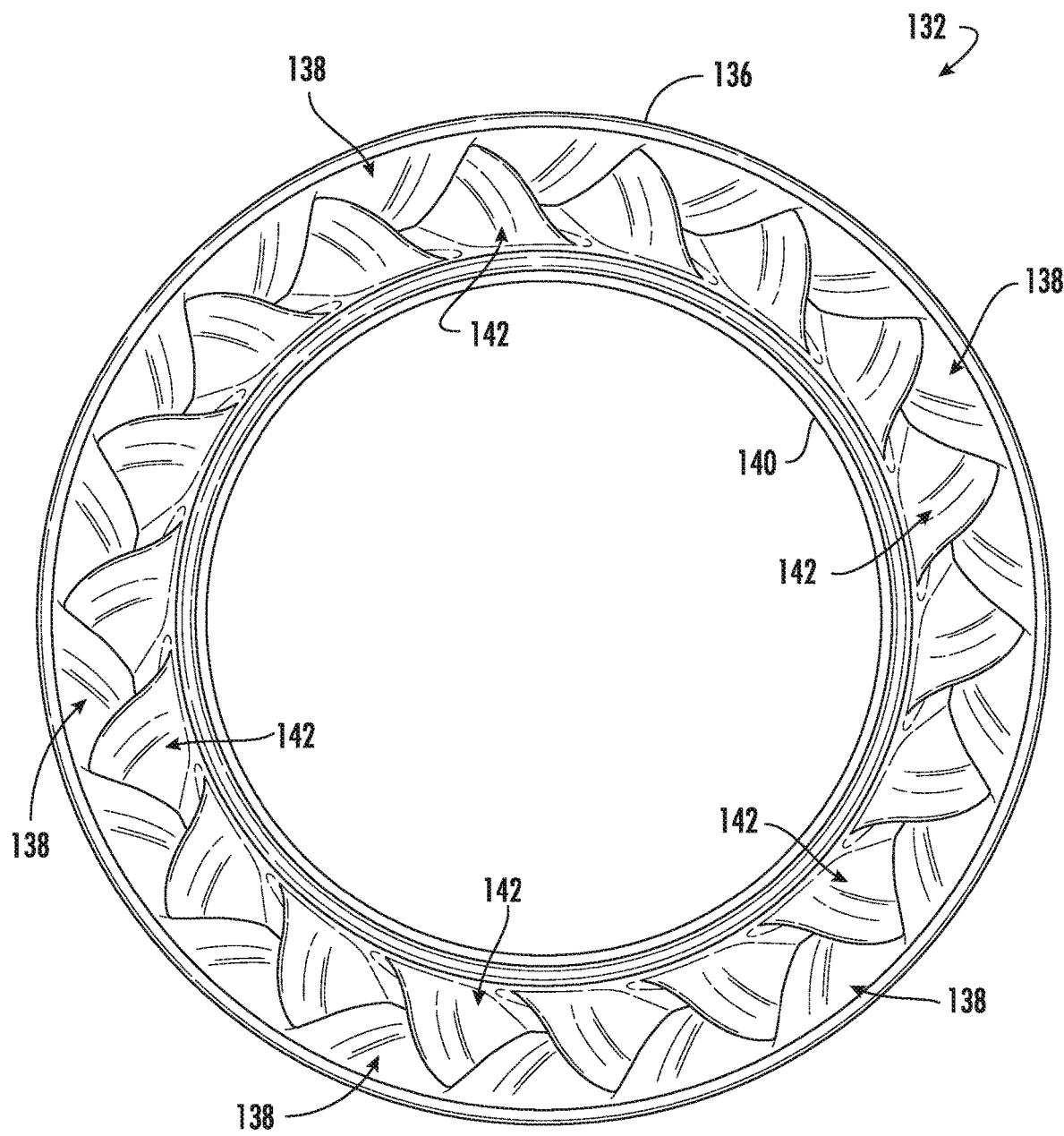
FIG. 5 is a second assembled, perspective view of an inner shell and an outer shell of a component assembly in accordance with an exemplary embodiment of the present disclosure.
Figure 6:
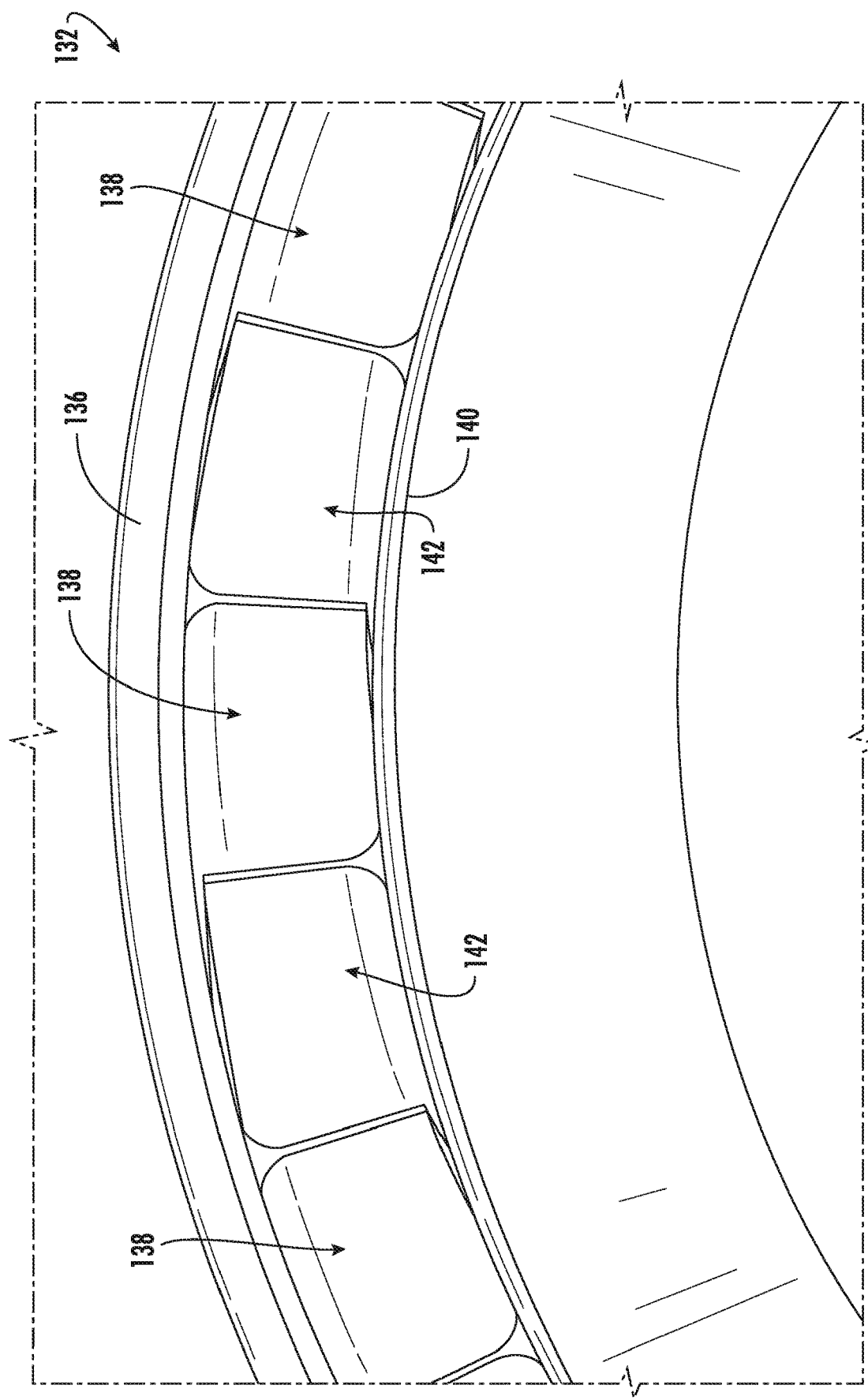
FIG. 6 is a close-up assembled, elevation view of an inner shell and an outer shell of a component assembly in accordance with an exemplary embodiment of the present disclosure.
Figure 7:
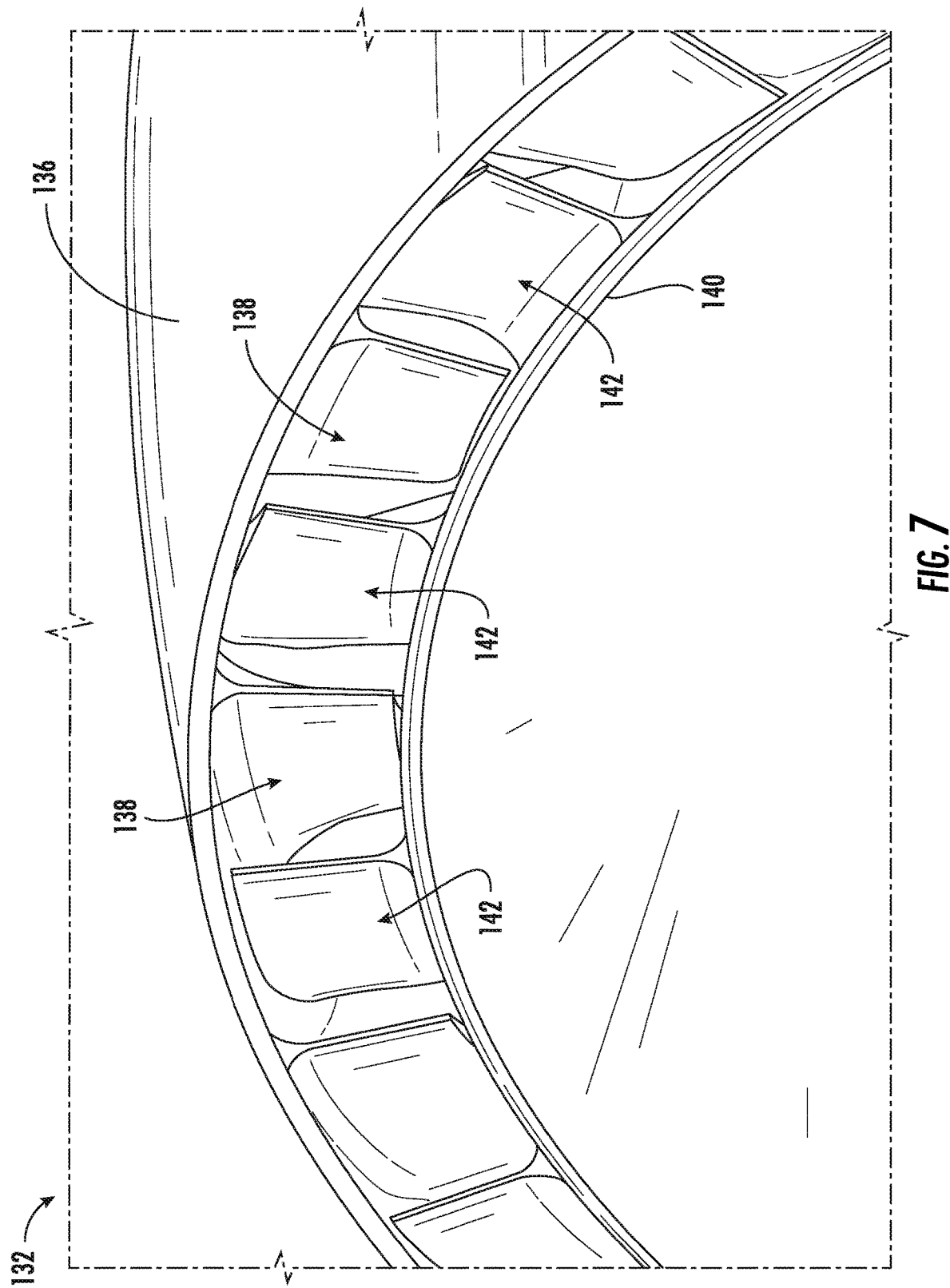
FIG. 7 is a close-up assembled, perspective view of a portion of an inner shell and an outer shell of a component assembly in accordance with an exemplary embodiment of the present disclosure.
Figure 8:
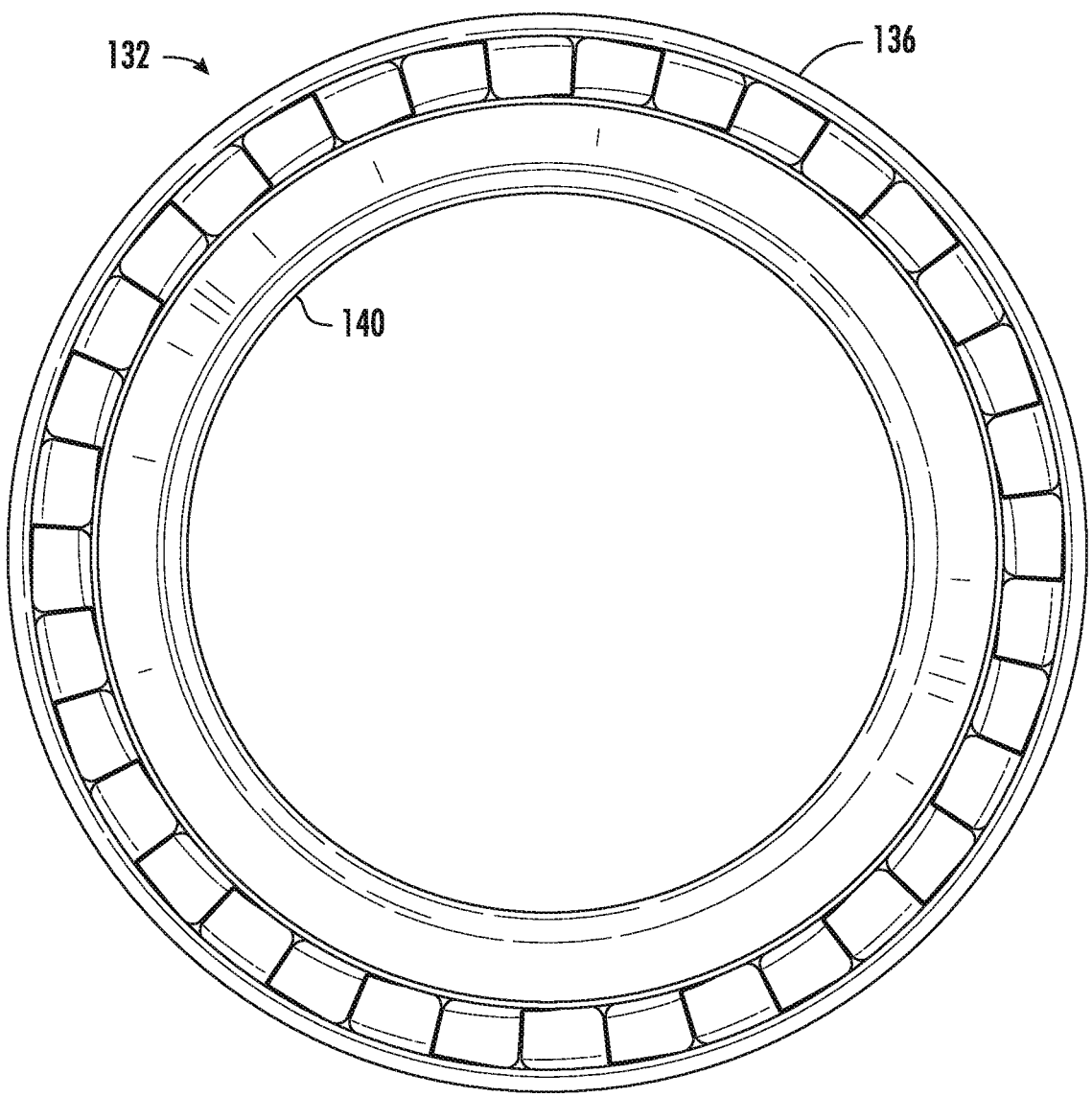
FIG. 8 is an assembled, elevation view of an inner shell and an outer shell of a component assembly in accordance with an exemplary embodiment of the present disclosure.

Referring to FIGS. 3B and 4, in an exemplary embodiment, the integral inner shell airfoils 142 include a second transition portion 170 at a second leading edge 172 and a second edge portion 174 at a second trailing edge 176. In one embodiment, the second transition portion 170 extends obliquely outward from the inner shell periphery 141. For example, the second transition portion 170 extends at an angle outward from the inner shell periphery 141, wherein the angle is not perpendicular to the inner shell periphery 141. In one embodiment, the inner shell 140 also defines a U-shaped trough 178 between adjacent integral inner shell airfoils 142. These U-shaped troughs 178 receive corresponding integral outer shell airfoils 138 in the staggered and alternating arrangement described herein. In one embodiment, the second transition portion 170 of the integral inner shell airfoils 142 has a different geometry than the first transition portion 160 of the integral outer shell airfoils 138.

In one embodiment, the integral inner shell airfoils 142 have a varying thickness from the second leading edge 172 to the second trailing edge 176. For example, the second transition portion 170 that extends obliquely outward from the inner shell periphery 141 has a first thickness portion that is less than a second thickness portion at the second edge portion 174. In an exemplary embodiment, the integral inner shell airfoils 142 have a non-symmetrical geometry. For example, the second transition portion 170 that extends obliquely outward from the inner shell periphery 141 has a first geometrical portion 190 that is different than a second geometrical portion 192 at the second edge portion 174.

By having the integral inner shell airfoils 142 with the geometry described herein and integral with the inner shell 140 and the integral outer shell airfoils 138 with the geometry described herein and integral with the outer shell 136, the airfoils 138, 142 of the present disclosure have a more aerodynamic shape and function than conventional systems in which nozzles are arranged as separate components aft of the combustor.

The present disclosure creates a shelled, lobe structure and is capable of replacing the stage one nozzles. In one embodiment, the continuous rings of the combustion liners are extended to replace the nozzle bands and the nozzle airfoils are formed as cantilevered lobes on the aft side of the combustor liners. As described herein, half of the airfoils are placed on the inner liner and half are placed on the outer liner and then mesh together at assembly to form a fully integrated flow path structure. In this manner, by integrating the airfoils and the nozzle geometry into the combustion liners to form a singular flow path structure eliminates flow path steps, purge flows, and interfacing hardware. The present disclosure reduces weight, simplifies mounting configuration, optimizes geometry into integral shell architecture, eliminates segment gaps inside assemblies, eliminates axial purge, reduces number of parts by eliminating individual nozzle singlet/doublets and supporting hardware, maintains cooling film from liner onto nozzle bands, and mitigates flow path steps.

In an exemplary embodiment, the integral inner shell airfoils 142 and the integral outer shell airfoils 138 define an airfoil shape and curved profile along the axial direction A for directing a flow of combustion air flowing therethrough in a desired direction. For example, the integral inner shell airfoils 142 and the integral outer shell airfoils 138 may define a chord line extending from a leading edge to a trailing edge, and a mean camber line also extending from the leading edge to the trailing edge. In an exemplary embodiment, the mean camber line is divergent from the chord line, such that the integral inner shell airfoils 142 and the integral outer shell airfoils 138 each define a camber. Referring to FIG. 10, although the integral inner shell airfoils 142 and the integral outer shell airfoils 138 are shown enclosed around a hollow cavity, it is contemplated, that in other exemplary embodiments, the cavity may be open to the cold side.

Figure 11:
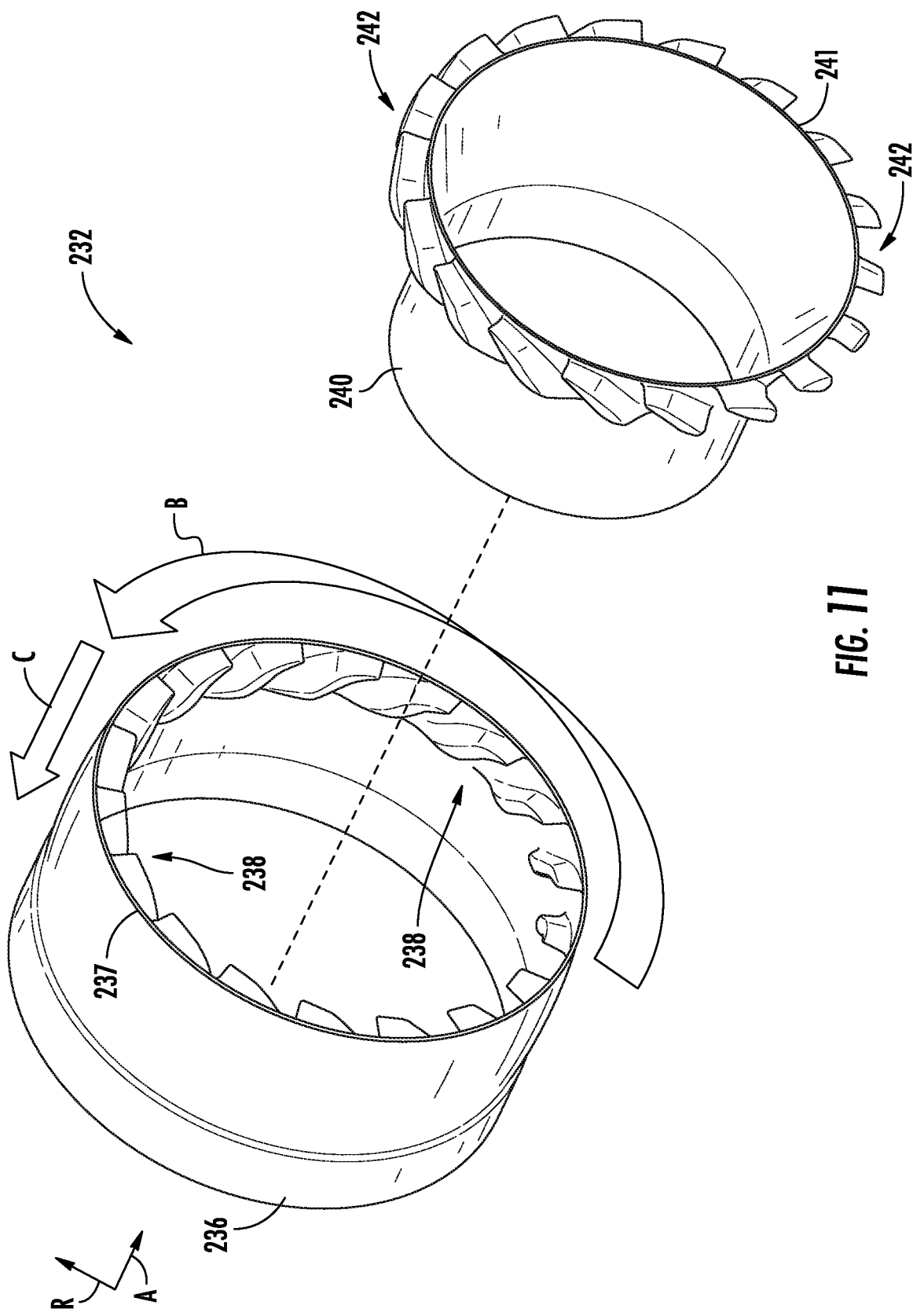
FIG. 11 is an assembled, perspective view of an inner shell and an outer shell of a component assembly in a first position in accordance with another exemplary embodiment of the present disclosure.
Figure 12:
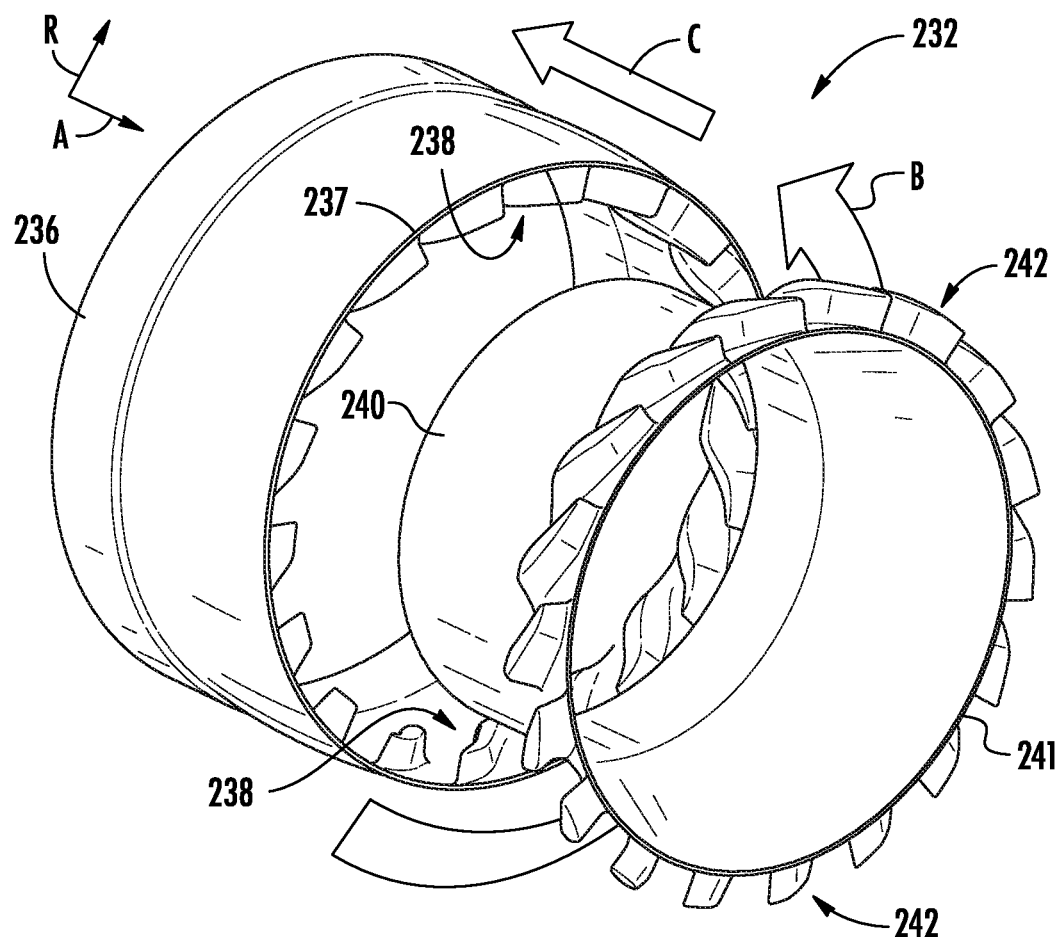
FIG. 12 is an assembled, perspective view of an inner shell and an outer shell of a component assembly in a second position in accordance with another exemplary embodiment of the present disclosure.
Figure 13:
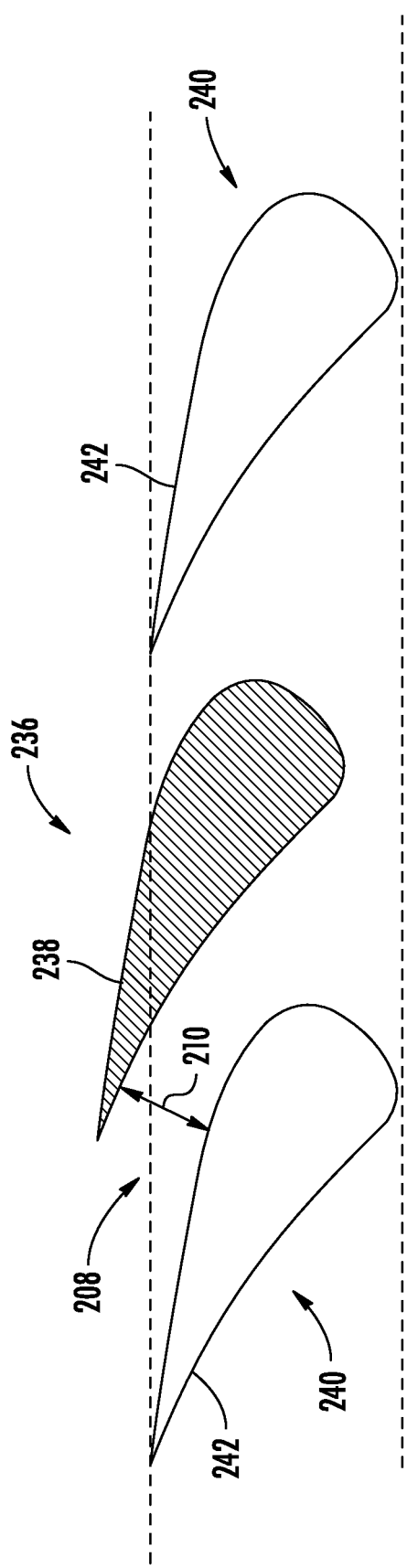
FIG. 13 is a cross-sectional view of airfoils of an outer shell and airfoils of an inner shell in a first position in accordance with another exemplary embodiment of the present disclosure.
Figure 14:
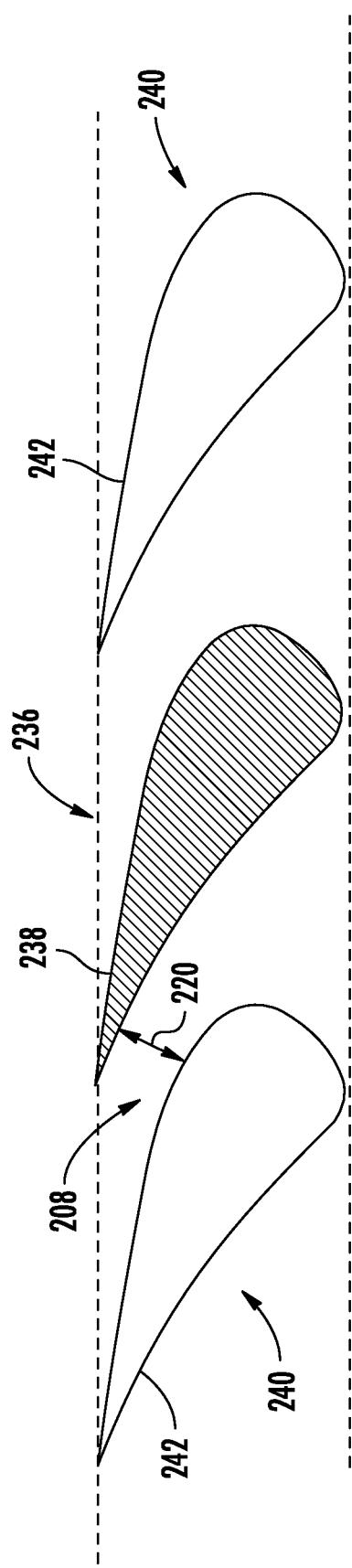
FIG. 14 is a cross-sectional view of airfoils of an outer shell and airfoils of an inner shell in a second position in accordance with another exemplary embodiment of the present disclosure.

Referring now to FIGS. 11-15, in exemplary embodiments, the outer shell and the inner shell are either translatable relative to one another or rotatable relative to one another between a first position and a second position. In exemplary embodiments of the present disclosure, the outer shell and the inner shell are both translatable and rotatable relative to one another between the first position and the second position. For example, in such embodiments, a component assembly 232 of the present disclosure includes an outer shell 236 and an inner shell 240 that are translatable relative to one another and rotatable relative to one another between a first position (FIGS. 11 and 13) and a second position (FIGS. 12 and 14). FIGS. 11-14 illustrate the outer shell 236 and the inner shell 240 farther apart than would be in actual practice for clarity to clearly illustrate that the outer shell 236 and the inner shell 240 are translatable and rotatable relative to one another to vary a distance between these components. In practice, such movements between the outer shell 236 and the inner shell 240 would be small in degree to change a throat distance as desired. It is contemplated that with the outer shell 236 and the inner shell 240 in the second position, the outer shell 236 and the inner shell 240 would be aligned as shown in FIG. 3C. It is further contemplated that the outer shell 236 and the inner shell 240 could be aligned in a variety of configurations in the first position and the second position, as required by certain engine operating conditions.

It is also contemplated that the outer shell 236 and the inner shell 240 can be translatable relative to one another or rotatable relative to one another between a first position and a second position in a variety of different configurations. For example, in an exemplary embodiment, the inner shell 240 and outer shell 236 can translate and rotate relative to one another. In another exemplary embodiment, the inner shell 240 and outer shell 236 can translate relative to one another. In yet another exemplary embodiment, the inner shell 240 and outer shell 236 can rotate relative to one another. In another exemplary embodiment, the inner shell 240 can rotate and translate relative to a fixed outer shell 236. In yet another exemplary embodiment, the inner shell 240 can rotate relative to a fixed outer shell 236. In another exemplary embodiment, the inner shell 240 can translate relative to a fixed outer shell 236. In another exemplary embodiment, the outer shell 236 can rotate and translate relative to a fixed inner shell 240. In yet another exemplary embodiment, the outer shell 236 can rotate relative to a fixed inner shell 240. In another exemplary embodiment, the outer shell 236 can translate relative to a fixed inner shell 240.

In this manner, the component assembly 232 of the present disclosure allows a core air flowpath 37 (FIG. 1) of engine 10 (FIG. 1) to be manipulated, i.e., a portion of the core air flowpath 37, such as a throat portion of the core air flowpath 37, can be increased or reduced during an aircraft mission. This allows the throat of the core air flowpath 37 to be set at a desired or optimum position during specific flight conditions of the aircraft mission.

Referring still to FIGS. 11-15, in exemplary embodiments, the outer shell 236 includes a first array of integral outer shell airfoils 238 that extend inward from an outer shell periphery 237. The inner shell 240 includes a second array of integral inner shell airfoils 242 that extend outward from an inner shell periphery 241.

Referring to FIGS. 11 and 13, in the first position, a throat 208 has a first throat distance 210 that is defined between the outer shell 236 and the inner shell 240, e.g., between a portion of an outer shell airfoil 238 and a portion of an inner shell airfoil 242 and/or between a portion of outer shell 236 and a portion of inner shell 240. For the embodiment depicted, the outer shell 236 and the inner shell 240 define a throat distance 210 therebetween that is a smallest distance between the outer shell 236 and the inner shell 240. However, it is contemplated that other regions between the outer shell 236 and the inner shell 240 could be used to define the throat distance 210 in the first position. It is contemplated that a throat distance may be defined between a portion of an outer shell airfoil 238 and a portion of an inner shell airfoil 242, and/or between a portion of outer shell 236 and a portion of inner shell 240, and/or between other points defined by outer shell 236 and inner shell 240.

In exemplary embodiments, the outer shell 236 and the inner shell 240 are in the first position during a prescribed operating condition of the engine 10. For example, the outer shell 236 and the inner shell 240 are in the first position during an engine take-off condition. In an engine take-off condition, it is advantageous to have more air flow through the throat 208 of the core air flowpath 37. As such, in one embodiment, in the first position, the outer shell 236 and the inner shell 240 are translated and rotated relative to one another to increase the first throat distance 210 to a maximum throat distance.

Referring to FIGS. 12 and 14, in the second position, a throat 208 has a second throat distance 220 that is defined between the outer shell 236 and the inner shell 240, e.g., between a portion of an outer shell airfoil 238 and a portion of an inner shell airfoil 242 and/or between a portion of outer shell 236 and a portion of inner shell 240. For the embodiment depicted, the outer shell 236 and the inner shell 240 define a throat distance 220 therebetween that is a smallest distance between the outer shell 236 and the inner shell 240. However, it is contemplated that other regions between the outer shell 236 and the inner shell 240 could be used to define the throat distance 220 in the second position. It is contemplated that a throat distance may be defined between a portion of an outer shell airfoil 238 and a portion of an inner shell airfoil 242, and/or between a portion of outer shell 236 and a portion of inner shell 240, and/or between other points defined by outer shell 236 and inner shell 240.

In exemplary embodiments, the outer shell 236 and the inner shell 240 are in the second position during a prescribed operating condition of the engine 10. For example, the outer shell 236 and the inner shell 240 are in the second position during an engine cruise condition. In an engine cruise condition, it is advantageous to have less air flow through the throat 208 of the core air flowpath 37. As such, in one embodiment, in the second position, the outer shell 236 and the inner shell 240 are translated and rotated relative to one another to reduce the second throat distance 220 to a minimum throat distance. In this manner, the second throat distance 220 is less than the first throat distance 210.

Furthermore, the component assembly 232 of the present disclosure allows the outer shell 236 and the inner shell 240 to be translatable relative to one another and/or rotatable relative to one another to any position between the first position (FIGS. 11 and 13) and the second position (FIGS. 12 and 14) for other desired prescribed operating conditions of the engine 10.

As described above, the component assembly 232 of the present disclosure includes an outer shell 236 and an inner shell 240 that are translatable relative to one another and/or rotatable relative to one another between a first position (FIGS. 11 and 13) and a second position (FIGS. 12 and 14). Referring to FIGS. 11 and 12, the outer shell 236 and the inner shell 240 rotates relative to one another in a direction generally along arrow B. Such rotation, moves the integral outer shell airfoils 238 relative to the integral inner shell airfoils 242. Additionally, the outer shell 236 and the inner shell 240 translate relative to one another in a direction generally along arrow C. Such translation, moves the outer shell 236 with respect to the inner shell 240 in an axial direction A. In other exemplary embodiments, the inner shell 240 may be translatable and rotatable relative to the outer shell 236 and/or the outer shell 236 may be translatable and rotatable relative to the inner shell 240 as described above.

Figure 15:
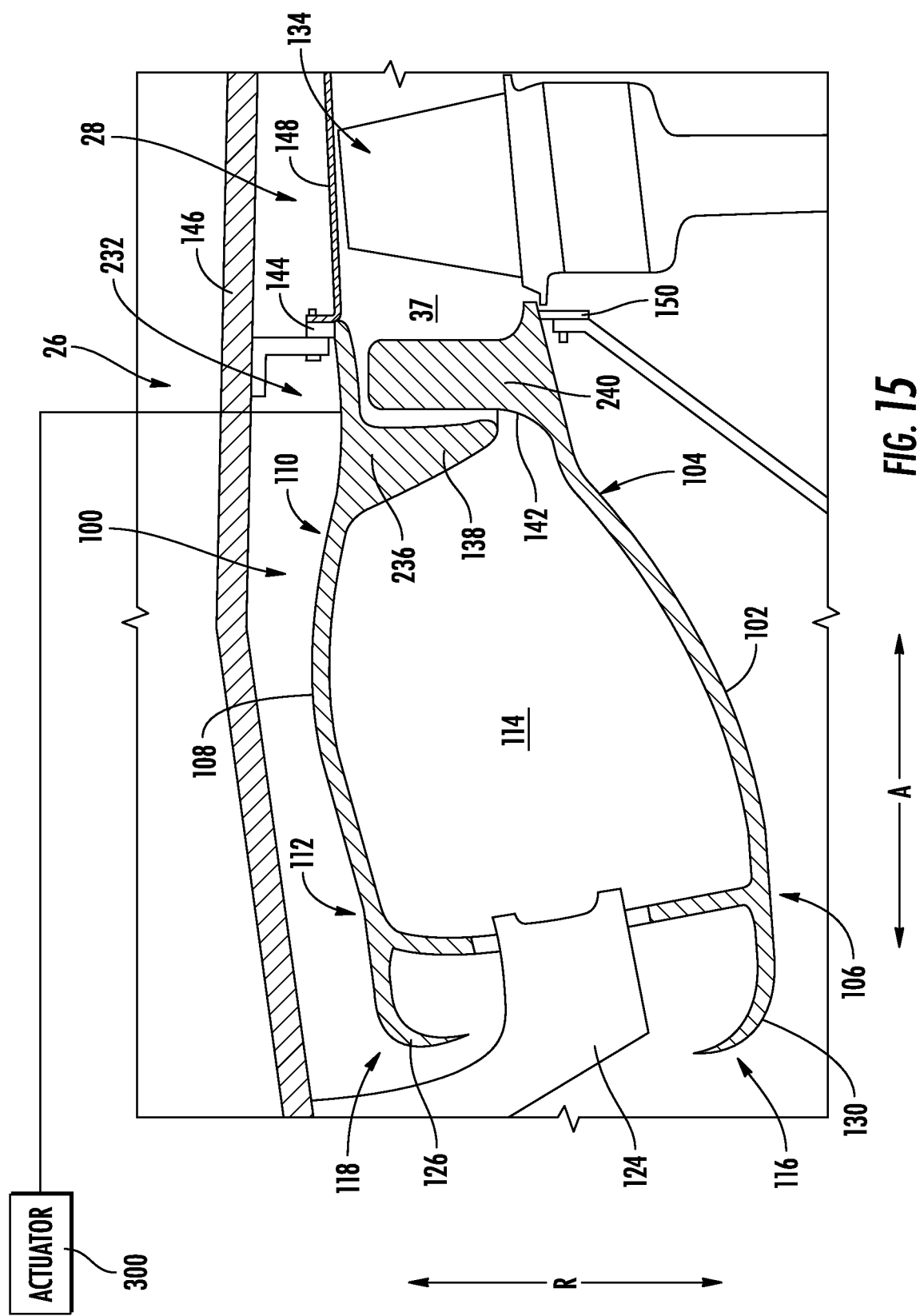
FIG. 15 is a schematic view of a combustor and an actuator for a component assembly in accordance with another exemplary embodiment of the present disclosure.

Referring to FIG. 15, in an exemplary embodiment, the component assembly 232 of the present disclosure includes an actuator 300 that is in communication with one of the outer shell 236 and the inner shell 240. It is also contemplated that, in other exemplary embodiments, the actuator 300 may be in communication with both of the outer shell 236 and the inner shell 240. The actuator 300 is configured to control rotation of the outer shell 236 and the inner shell 240 relative to one another and the actuator 300 is configured to control translation of the outer shell 236 and the inner shell 240 relative to one another. It is contemplated that the actuator 300 of the present disclosure can be any engine control system associated with the engine 10 to control movement of the outer shell 236 and the inner shell 240 relative to one another. It is contemplated that the actuator 300 may be in communication with the outer shell 236 and the inner shell 240 in various configurations that may require the actuator 300 to move one of the outer shell 236 and the inner shell 240 or may require movement of both. For example, it is contemplated that the outer shell 236 and the inner shell 240 can be translatable relative to one another or rotatable relative to one another via the actuator 300 between a first position and a second position in a variety of different configurations. For example, in an exemplary embodiment, the inner shell 240 and outer shell 236 can translate and rotate relative to one another via the actuator 300. In another exemplary embodiment, the inner shell 240 and outer shell 236 can translate relative to one another via the actuator 300. In yet another exemplary embodiment, the inner shell 240 and outer shell 236 can rotate relative to one another via the actuator 300. In another exemplary embodiment, the inner shell 240 can rotate and translate relative to a fixed outer shell 236 via the actuator 300. In yet another exemplary embodiment, the inner shell 240 can rotate relative to a fixed outer shell 236 via the actuator 300. In another exemplary embodiment, the inner shell 240 can translate relative to a fixed outer shell 236 via the actuator 300. In another exemplary embodiment, the outer shell 236 can rotate and translate relative to a fixed inner shell 240 via the actuator 300. In yet another exemplary embodiment, the outer shell 236 can rotate relative to a fixed inner shell 240 via the actuator 300. In another exemplary embodiment, the outer shell 236 can translate relative to a fixed inner shell 240 via the actuator 300.

As described above with respect to FIGS. 1 and 2, the the gas turbine engine 10 includes a combustor 100 defining a combustion chamber 114. Advantageously, the component assembly 232 of the present disclosure allows for the actuator 300 to be located upstream of the combustor 100, as shown in FIG. 15. By locating the actuator 300 upstream of the combustor 100, performance of the actuator 300 is increased because of reduced temperatures in this location and increased physical volume in this location, which enable a more robust actuation system.

In an exemplary aspect of the present disclosure, a method is provided for varying a throat distance between airfoils in a gas turbine engine. The method includes providing a component assembly comprising an outer shell having a first array of integral outer shell airfoils and an inner shell having a second array of integral inner shell airfoils; rotating the outer shell and the inner shell relative to one another from a first position to a second position; and translating the outer shell and the inner shell relative to one another from the first position to the second position.

Further aspects of the invention are provided by the subject matter of the following clauses:

1. A component assembly for a gas turbine engine defining a core air flowpath, the component assembly comprising: an outer shell comprising a first array of integral outer shell airfoils that extend inward from an outer shell periphery; and an inner shell comprising a second array of integral inner shell airfoils that extend outward from an inner shell periphery, wherein the outer shell and the inner shell are one or both of translatable and rotatable relative to one another between a first position and a second position.

2. The component assembly of any preceding clause, wherein the outer shell and the inner shell are both translatable and rotatable relative to one another between the first position and the second position.

3. The component assembly of any preceding clause, wherein, in the first position, a first throat distance is defined between the outer shell and the inner shell, and wherein, in the second position, a second throat distance is defined between the outer shell and the inner shell, and wherein the second throat distance is less than the first throat distance.

4. The component assembly of any preceding clause, wherein the outer shell rotates with respect to the inner shell such that the integral outer shell airfoils move relative to the integral inner shell airfoils.

5. The component assembly of any preceding clause, wherein the outer shell translates in an axial direction with respect to the inner shell.

6. The component assembly of any preceding clause, further comprising an actuator in communication with one of the outer shell and the inner shell, wherein the actuator rotates the outer shell and the inner shell relative to one another, and wherein the actuator translates the outer shell and the inner shell relative to one another.

7. The component assembly of any preceding clause, wherein the gas turbine engine includes a combustor defining a combustion chamber, wherein the outer shell at least partially defines the core air flowpath, wherein the inner shell at least partially defines the core air flowpath, wherein a portion of the outer shell defines a first part of the combustion chamber, and wherein a portion of the inner shell defines a second part of the combustion chamber.

8. The component assembly of any preceding clause, wherein the actuator is located upstream of the combustor.

9. A component assembly for a gas turbine engine defining a core air flowpath, the component assembly comprising: an outer shell comprising a first array of integral outer shell airfoils that extend inward from an outer shell periphery; an inner shell comprising a second array of integral inner shell airfoils that extend outward from an inner shell periphery; and an actuator in communication with one of the outer shell and the inner shell, wherein the outer shell and the inner shell are one or both of translatable and rotatable relative to one another between a first position and a second position.

10. The component assembly of any preceding clause, wherein the actuator rotates the outer shell and the inner shell relative to one another, and wherein the actuator translates the outer shell and the inner shell relative to one another.

11. The component assembly of any preceding clause, wherein the gas turbine engine includes a combustor defining a combustion chamber, wherein the outer shell at least partially defines the core air flowpath, wherein the inner shell at least partially defines the core air flowpath, wherein a portion of the outer shell defines a first part of the combustion chamber, and wherein a portion of the inner shell defines a second part of the combustion chamber.

12. A method for varying a throat distance between airfoils in a gas turbine engine comprising: providing a component assembly comprising an outer shell having a first array of integral outer shell airfoils and an inner shell having a second array of integral inner shell airfoils; rotating the outer shell and the inner shell relative to one another from a first position to a second position; and translating the outer shell and the inner shell relative to one another from the first position to the second position.

13. The method of any preceding clause, wherein rotating the outer shell and the inner shell relative to one another from the first position to the second position moves the integral outer shell airfoils relative to the integral inner shell airfoils, and wherein translating the outer shell and the inner shell relative to one another from the first position to the second position includes moving the outer shell and the inner shell relative to one another in an axial direction.

14. The method of any preceding clause, wherein, in the first position, a first throat distance is defined between the outer shell and the inner shell, and wherein, in the second position, a second throat distance is defined between the outer shell and the inner shell, and wherein the second throat distance is less than the first throat distance.

15. The method of any preceding clause, further comprising providing an actuator in communication with one of the outer shell and the inner shell, wherein the actuator rotates the outer shell and the inner shell relative to one another, and wherein the actuator translates the outer shell and the inner shell relative to one another.

16. The method of any preceding clause, wherein the gas turbine engine defines a core air flowpath and includes a combustor defining a combustion chamber, wherein the outer shell at least partially defines the core air flowpath, and wherein the inner shell at least partially defines the core air flowpath, wherein a portion of the outer shell defines a first part of the combustion chamber, and wherein a portion of the inner shell defines a second part of the combustion chamber.

17. The method of any preceding clause, wherein the actuator is provided upstream of the combustor.

18. The method of any preceding clause, wherein the outer shell and the inner shell are in the first position during an engine take-off condition, and wherein the outer shell and the inner shell are rotated and translated to the second position during an engine cruise condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A component assembly for a gas turbine engine defining a core air flowpath and a combustion chamber, the component assembly comprising:

an outer shell configured to at least partially define a first portion of the core air flowpath and a first portion of the combustion chamber, the outer shell comprising a first array of integral outer shell airfoils that extend inward from an outer shell periphery; and an inner shell configured to at least partially define a second portion of the core air flowpath and a second portion of the combustion chamber, the inner shell comprising a second array of integral inner shell airfoils that extend outward from an inner shell periphery; and an actuator in communication with one of the outer shell and the inner shell, wherein the outer shell and the inner shell are one or both of translatable and rotatable relative to one another between a first position and a second position by the actuator.

2. The component assembly of claim 1, wherein the outer shell and the inner shell are both translatable and rotatable relative to one another between the first position and the second position.

3. The component assembly of claim 2, wherein, in the first position, a first throat distance is defined between the outer shell and the inner shell, and wherein, in the second position, a second throat distance is defined between the outer shell and the inner shell, and wherein the second throat distance is less than the first throat distance.

4. The component assembly of claim 2, wherein the outer shell rotates with respect to the inner shell such that each of the first array of integral outer shell airfoils move relative to each of the second array of integral inner shell airfoils.

5. The component assembly of claim 4, wherein the outer shell translates in an axial direction with respect to the inner shell.

6. The component assembly of claim 1, wherein the actuator rotates the outer shell and the inner shell relative to one another, and wherein the actuator translates the outer shell and the inner shell relative to one another.

7. The component assembly of claim 1, wherein the actuator is configured to be located upstream of a combustor.

8. A gas turbine engine defining a core air flowpath and a combustion chamber, the gas turbine engine comprising:

an outer shell at least partially defining a first portion of the core air flowpath and a first portion of the combustion chamber, the outer shell comprising a first array of integral outer shell airfoils that extend inward from an outer shell periphery;

an inner shell at least partially defining a second portion of the core air flowpath and a second portion of the combustion chamber, the inner shell comprising a second array of integral inner shell airfoils that extend outward from an inner shell periphery; and an actuator in communication with one of the outer shell and the inner shell, wherein the outer shell and the inner shell are one or both of translatable and rotatable relative to one another between a first position and a second position by the actuator.

9. The gas turbine engine of claim 8, wherein the actuator rotates the outer shell and the inner shell relative to one another, and wherein the actuator translates the outer shell and the inner shell relative to one another.

10. The component assembly of claim 1, wherein each of the first array of integral outer shell airfoils are hollow.

11. The component assembly of claim 1, wherein each of the first array of integral outer shell airfoils are configured as solid airfoils.

12. A component assembly for a gas turbine engine defining a core air flowpath, the component assembly comprising:
- an outer shell comprising a first array of integral outer shell airfoils that extend inward from an outer shell periphery; and
- an inner shell comprising a second array of integral inner shell airfoils that extend outward from an inner shell periphery, the first array of integral outer shell airfoils and second array of inner shell airfoils together forming a stage one nozzle for the gas turbine engine;
- wherein the outer shell and the inner shell are one or both of translatable and rotatable relative to one another between a first position during a first operating condition of the gas turbine engine and a second position during a second operating condition of the gas turbine engine.

13. The component assembly of claim 12, further comprising:
- an actuator in communication with one of the outer shell and the inner shell.

14. The component assembly of claim 13, wherein the outer shell and the inner shell are one or both of translatable and rotatable relative to one another between a first position and a second position by the actuator.

15. The component assembly of claim 12, wherein the outer shell configured to at least partially define a first portion of the core air flowpath and a first portion of a combustion chamber of the gas turbine engine, and wherein the inner shell is configured to at least partially define a second portion of the core air flowpath and a second portion of the combustion chamber.

16. The component assembly of claim 12, wherein, in the first position, a first throat distance is defined between the outer shell and the inner shell, and wherein, in the second position, a second throat distance is defined between the outer shell and the inner shell, and wherein the second throat distance is less than the first throat distance.

\* \* \* \* \*